(12) United States Patent
Hirayama et al.

(10) Patent No.: US 10,021,864 B2
(45) Date of Patent: Jul. 17, 2018

(54) FISHING REEL AND MAGNETIC SEAL DEVICE THEREFOR

(71) Applicant: Shimano, Inc., Osaka (JP)

(72) Inventors: Hirokazu Hirayama, Osaka (JP);
Daiki Sumikawa, Tokyo (JP);
Hirokazu Hiraoka, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 348 days.

(21) Appl. No.: 15/007,027

(22) Filed: Jan. 26, 2016

(65) Prior Publication Data

US 2016/0286775 A1    Oct. 6, 2016

(30) Foreign Application Priority Data

Mar. 31, 2015    (JP) ................................. 2015-072710

(51) Int. Cl.
*A01K 89/01*    (2006.01)
*A01K 89/015*    (2006.01)

(52) U.S. Cl.
CPC ...... *A01K 89/011221* (2015.05); *A01K 89/01* (2013.01); *A01K 89/015* (2013.01); *A01K 89/0117* (2013.01); *A01K 89/01928* (2015.05)

(58) Field of Classification Search
CPC ............ A01K 89/01; A01K 89/011221; A01K 89/011223
See application file for complete search history.

(56) References Cited

U.S. PATENT DOCUMENTS

| 9,775,333 | B2* | 10/2017 | Hirayama | A01K 89/01122 |
| 2011/0174909 | A1* | 7/2011 | Shibata | A01K 89/01 242/230 |
| 2015/0373961 | A1* | 12/2015 | Horie | A01K 89/01 242/234 |
| 2016/0113261 | A1* | 4/2016 | Hirayama | A01K 89/01122 242/319 |

FOREIGN PATENT DOCUMENTS

| EP | 3124835 A1 * | 2/2017 | ............... F16J 15/43 |
| JP | 2010187566 | 9/2010 | |
| JP | 2011167186 | 9/2011 | |
| JP | 2014161300 | 9/2014 | |

OTHER PUBLICATIONS

EP16159646.5 Supplemental Search Report dated Aug. 9, 2016.

* cited by examiner

*Primary Examiner* — Emmanuel M Marcelo
(74) *Attorney, Agent, or Firm* — Jeffer Mangels Butler & Mitchell LLP; Brennan C. Swain, Esq.

(57) ABSTRACT

A fishing reel that includes a reel body, a housing part that defines an opening part, a driving member that includes a pinion that is supported by the reel body and extends through the opening part of the housing part, and a magnetic seal device affixed to the housing part that includes a central opening through which the pinion extends. The magnetic seal device includes first and second magnetic plates that maintain a magnet therebetween and a magnetic fluid that is maintained at a gap between the driving member and at least one of the first and second magnetic plates.

14 Claims, 4 Drawing Sheets

FIG. 5

FISHING REEL AND MAGNETIC SEAL DEVICE THEREFOR

FIELD OF THE INVENTION

The said invention relates to a fishing reel and a magnetic seal device used for fishing reels.

BACKGROUND OF THE INVENTION

Fishing reels are often used in harsh and severe environments where water can inundate the reel. In order to prevent inundation at a driving member which is provided in a housing part of the fishing reel, and to always ensure stable driving performance in a harsh environment, a seal device is provided at the driving member. For example, see Japanese Patent Application Publication Nos. 2010-187566 and 2011-167186, both of which are incorporated by reference herein in their entireties, and which disclose fishing reels where a magnetic seal is used as the seal device.

SUMMARY OF THE PREFERRED EMBODIMENTS

The fishing reel in accordance with a first aspect of the invention provides a reel body, a driving member which is supported by the reel body so that it can rotate, a housing part which protrudes the driving member from the opening part, partly houses the driving member and is fitted to the reel body, and a magnetic seal device which seals a gap between the housing part and the driving member at the opening part of the housing part. The magnetic seal device includes a magnet, first and second magnetic plates which maintain the magnet, the first magnetic plate is located adjacent the housing part and the second magnetic plate is located on an opposite side of the housing part of the magnet, and a magnetic fluid which is maintained at the gap between the driving member and at least one of the first magnetic plate and the second magnetic plate. Then, the exterior diameter of the surface of the internal side, which joins the edge of the opening part periphery of the housing part of the magnetic seal device that includes the first magnetic plate, the magnet and the second magnetic plate.

It is preferable that the exterior diameter of the first magnetic plate is larger than that of the second magnetic plate. It is preferable that there are further fixing components which fix the magnetic plate of the magnetic seal device to the housing part. It is preferable that a hole which extends through the fixing component is formed with one of the larger exterior diameters of the first magnetic plate and the second magnetic plate. It is preferable that the fixing component be a screw which has a screw part and a screw head, and a height from the magnet side surface of the first magnetic plate to the opposite side surface of the second magnetic plate is larger than a height of the screw head.

The magnetic seal device used for the fishing reel, in accordance with a second aspect of the invention seals a gap between the driving member and the housing part. The housing part is fixed to the reel body and at least partially accommodates the driving member extending through the opening of the housing part. The magnetic seal device is comprised of a magnet, a first magnetic plate and a second magnetic plate which maintain the magnet therebetween, and a magnetic fluid which is maintained at the gap between the driving member and at least one of the first magnetic plate and the second magnetic plate. Then, an exterior diameter of the internal side surface of the magnetic seal device which joins the edge of the opening parts periphery of the housing part which is larger than an exterior diameter of the external side surface of the magnetic seal device. A hole which extends through the fixing component in order to fix the magnetic seal device to the housing part is formed at the one of larger exterior diameters of the first magnetic plate and the second magnetic plate.

In accordance with the invention, it is unnecessary to form a segment at the edge of the housing part in order to install the magnetic seal device. As a result, the structure of the opening part which is sealed at the magnetic seal device is simple and easy to process.

In accordance with another aspect of the invention there is provided a fishing reel that includes a reel body, a housing part that at least partially accommodates the driving member extending through an opening part thereof, and a magnetic seal device that seals a gap between the housing part and the driving member. The magnetic seal device includes a magnet, a first magnetic plate and a second magnetic plate that maintain the magnet therebetween, and a magnetic fluid maintained at a gap between the driving member and at least one of the first magnetic plate and the second magnetic plate. An external diameter of the housing part is larger than the external diameter of the magnetic seal device. In a preferred embodiment, the first magnetic plate is located adjacent the housing part and the second magnetic plate is located on an opposite side of the housing part of the magnet, and the external diameter of the first magnetic plate is larger than an external diameter of the second magnetic plate. Preferably, the reel includes a fixing component that fixes the magnetic seal device to the housing part. In a preferred embodiment, a hole is formed in one of the first magnetic plate or the second magnetic plate and the fixing component is received in the hole. Preferably, the fixing component is a screw that includes a screw part and a screw head. The first and second magnetic plates each include a front surface. A distance from the front surface of the first magnetic plate to the front surface of the second magnetic plate is preferably larger than a height of the screw head.

In accordance with another aspect of the invention there is provided a fishing reel that includes a reel body, a housing part that defines an opening part, a driving member that includes a pinion that is supported by the reel body and extends through the opening part of the housing part, and a magnetic seal device that is affixed to the housing part and includes a central opening through which the pinion extends. The magnetic seal device includes first and second magnetic plates that maintain a magnet therebetween and a magnetic fluid that is maintained at a gap between the driving member and at least one of the first and second magnetic plates. In a preferred embodiment, the housing part includes a cover member and the first magnetic plate is attached to a front surface of the cover member. Preferably, the cover member has an outer diameter that is larger than an outer diameter of the magnetic seal device.

In a preferred embodiment, one of the first and second magnetic plates has an outer diameter that is larger than the other of the first and second magnetic plates. Preferably, it is the first magnetic plate that has the larger outer diameter and a first hole is formed in the first magnetic plate. A fixing component extends through the first hole to attach the first magnetic plate to the cover member. Preferably, the fixing component is a screw that includes a screw part and a screw head and the first and second magnetic plates each include a front surface. A distance from the front surface of the first magnetic plate to the front surface of the second magnetic plate is larger than a height of the screw head.

In a preferred embodiment, the reel further comprises a rotor that includes a cylinder part, a wall part and a boss part and the boss part is at least partially received in the central opening of the magnetic seal device. Preferably a magnetic body at least partially surrounds the boss part and the magnetic fluid is maintained between the magnetic body and at least one of the first and second magnetic plates.

In a preferred embodiment, the first magnetic plate includes a second hole defined therein and the cover member includes at least one protrusion extending from a front surface thereof that is received in the second hole. Preferably, the second hole is open to an exterior diameter of the first magnetic plate.

In accordance with another aspect of the invention there is provided a magnetic seal device that includes first and second magnetic plates that maintain a magnet therebetween. The first magnetic plate has an outer diameter that is larger than the second magnetic plate, at least one of the first holes is formed in the first magnetic plate, and a fixing component extends through the first hole and is adapted to attach the first magnetic plate to a cover member.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
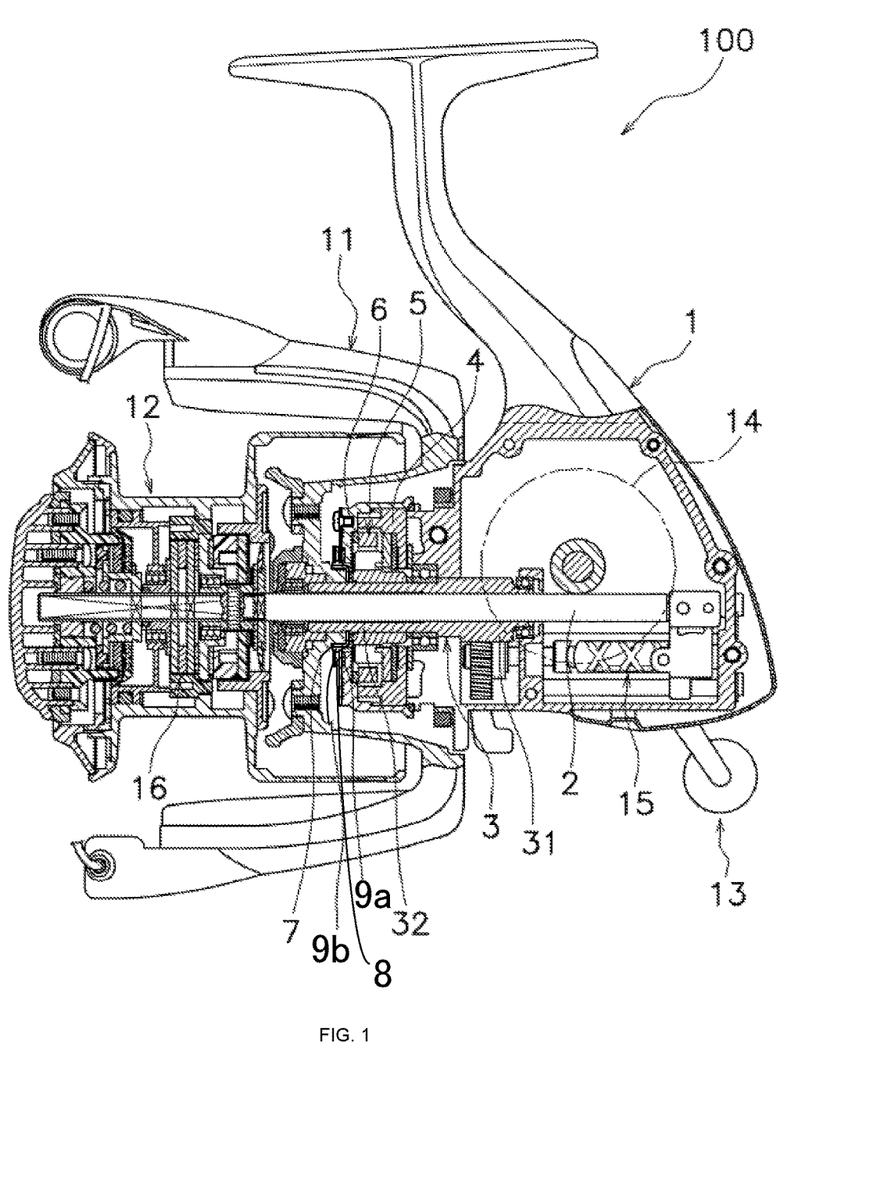
FIG. 1 is a sectional view of the fishing reel in accordance with an embodiment of the invention.

FIG. 1 is a sectional view of a fishing reel in accordance with an embodiment of the invention. The embodiment takes the spinning reel 100 of the fishing reel as an objective. The spinning reel 100 is installed on a fishing rod in such a way that the left direction faces the front end (foreside) of the fishing rod when viewing FIG. 1. The spinning reel 100 includes a reel body 1, a rotor 11, a spool 12 and a handle 13. Fishing line (not illustrated), which is wound around the spool 12, is casted out forward, i.e., in the left direction of FIG. 1.

The rotor 11 rotates around a central shaft which extends in the forward/backward direction, i.e., in the left/right direction of FIG. 1, by rotating the handle 13 which serves as a crank. Once the handle 13 is rotated, the spool 12 moves to-and-fro in the forward/backward direction at the same time as the rotation of the rotor 11. In accordance with its movement, the fishing line which has been let out is guided by the rotor 11 and uniformly wound to the bobbin trunk of the spool 12.

The rotor 11 is fixed to a fixing part 32 of a pinion gear 3 and rotates together with the pinion gear 3. The pinion gear 3 is rotatably supported by the reel body 1 so that it can rotate. The pinion gear 3 is formed as like a cylindrical shape, and a spool shaft 2 extends through the pinion gear 3. The spool shaft 2 and the pinion gear 3 can rotate and can move to-and-fro relatively. The spool 12 is installed on the front end of the spool shaft 2 via the drag mechanism. The rear end side of the spool shaft 2 is connected to the oscillating mechanism 15.

The handle 13 is the crank and a driving gear 14 is installed at the crank shaft. The driving gear 14 is engaged with a gear part 31 of the pinion gear 3, for example, by a bevel gear. The oscillating mechanism 15 rotates simultaneously with the pinion gear 3. Once the oscillating mechanism 15 rotates, the spool shaft 2 is moved to-and-fro in the forward/backward direction. The rear end side of the spool shaft 2, the gear part 31 side of the pinion gear 3, the driving gear 14 and the oscillating mechanism 15 are housed by the reel body 1.

A one-way clutch 5 is located between the pinion gear 3 and a housing part 4 so that the pinion gear 3 rotates in a unidirectional way only. The housing part 4 is fixed to the reel body. An inner side of the one-way clutch 5 is fitted to the pinion gear 3 and rotates together with the pinion gear 3. An outer side of the one-way clutch 5 is fitted and fixed to the housing part 4.

The one-way clutch 5 is, for example, a roller-type one-way clutch. The roller-type one-way clutch comprises an outer race, an inner race, rollers and springs. The cam surface is formed on the internal periphery of the outer race or the external periphery of the inner race. The roller is located opposite to the cam surface and is kept to join the cam surface of the outer race and the external periphery of the inner race or the cam surface of the inner race and the internal periphery due to the spring. Once the inner race is to rotate in a unidirectional way against the outer race, the contact pressure between the cam surface and the roller becomes high and causes resistance, so the inner race does not rotate against the outer race. Once the inner race rotates in the opposite direction, the contact pressure between the cam surface and the roller becomes low, so the roller idles and the inner race rotates against the outer race. As a result, the pinion gear 3 rotates in a unidirectional way only.

The one-way clutch 5 is secured in the housing part 4 by a cover member 6. The cover member 6 covers the front side of the housing part 4 excluding the rotation part comprising the pinion gear 3 and the boss part which is fitted to the pinion gear 3 of the rotor 11. The cover member 6 is fixed so that it does not contact the rotation part.

In order to seal a gap between the cover member 6 and the boss part of the rotor 11 together, a magnetic seal device which contains a ring-shaped magnet 8, and magnetic plates 9a and 9b is provided. Additionally, a ring-shaped magnetic body 7 is formed around the external periphery of the boss part in its rotation direction. The magnetic body 7 and the magnet 8 are opposite to the magnetic plates 9a and 9b and there is a gap between the magnetic body 7 and the magnet 8 and the magnetic plates 9a and 9b. The magnetic circuit is formed by the magnet 8, magnetic plates 9a and 9b and the magnetic body 7. Magnetic fluid 10 is disposed and maintained between the magnetic body 7 and the magnetic plates 9a and 9b and the cover member 6 and the magnetic body 7 (boss part) are sealed together.

The pinion gear 3, the boss part of the rotor 11 and the magnetic body 7 and the driving member 2 which is supported by the reel body 1 so that it can rotate. In this embodiment, the driving member comprises the pinion gear 3 that protrudes through the cover member 6 and the housing part 4. The boss part and the magnetic body 7 form the opening part in the housing part 4 which partly houses the pinion gear 3. The cover member 6 and the housing part 4 are fixed against the reel body 1. The magnetic seal device seals a gap between the housing part and the driving member together at the opening part of the housing part.

Figure 2:
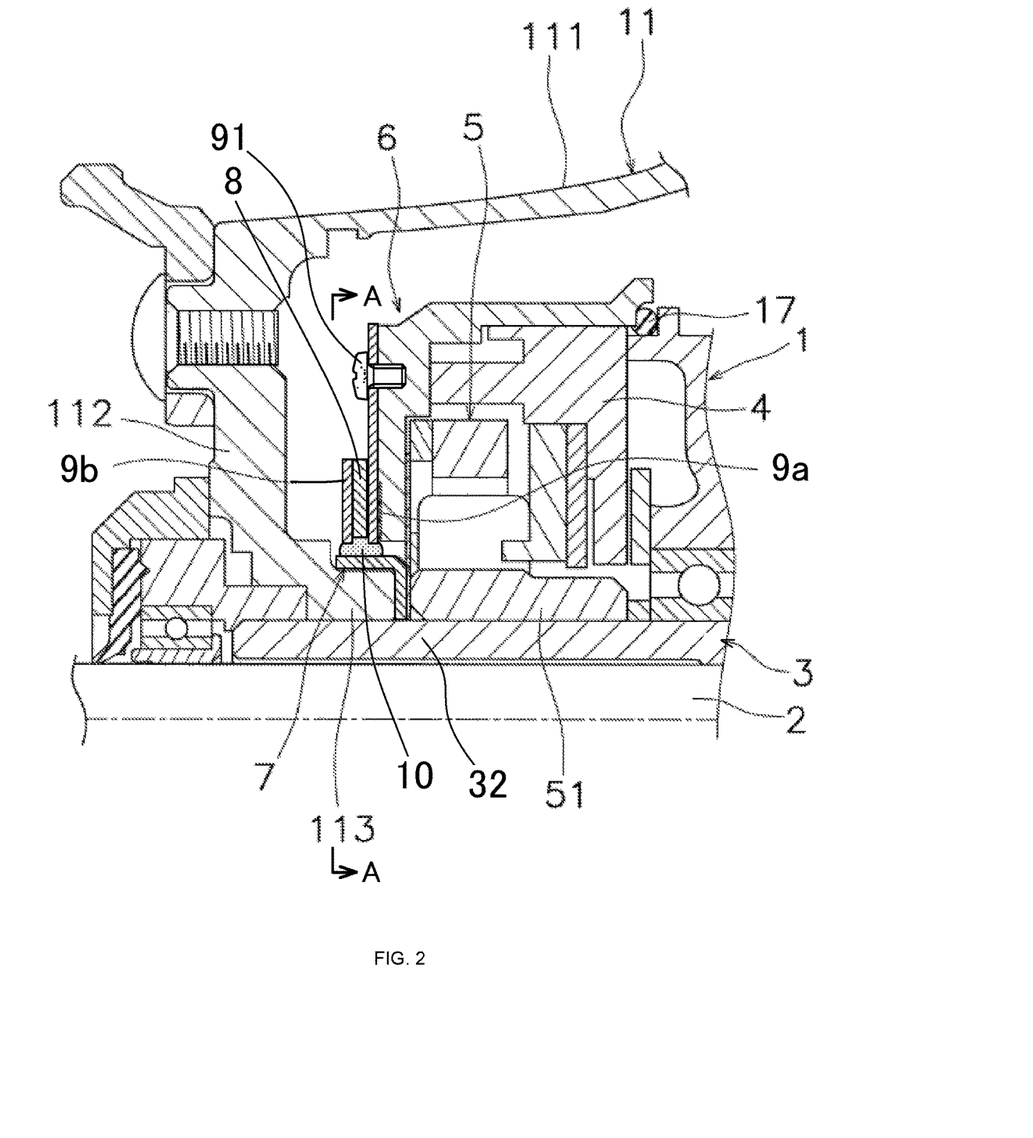
FIG. 2 is a sectional view of the magnetic seal device part in accordance with the embodiment.

FIG. 2 is a sectional view of the magnetic seal device in accordance with the embodiment. FIG. 2 only shows the lateral side against the central line of the spool shaft 2.

The rotor 11 comprises a cylinder part 111, a wall part 112 and the boss part 113. These are formed integrally by one component. The cylinder part 111 is a cylinder-shaped component and has housing room (accommodating room) inside itself. The external periphery of the wall part 112 is connected to the internal periphery of the cylinder part 111. The boss part 113 extends to the one-way clutch 5 from the internal periphery end of the wall part 112. The boss part 113 is fitted and fixed to the fixing part 32 of the pinion gear 3 while the rotor 11 rotates together with the pinion gear 3.

The housing part 4 is fixed by, for example, a screw so that it does not rotate against the reel body 1 in front of the reel body 1. The one-way clutch 5 is housed and accommodated inside the housing part 4. The cover member 6 is a ring-shaped component comprising a cylinder part which covers the external periphery of the housing part 4 and the cover member 6 covers the front side of the housing part 4. The cover member 6 keeps the one-way clutch 5 inside the housing part 4 through the cover member 6. The cover member 6 is fixed to the reel body 1 by, for example, the screw 91. A ring seal 17 is located between the end part of the cylinder part of the cover member 6 and the reel body 1. The internal periphery of the cover member 6 is opposite to and has an interval gap from the external periphery of the magnetic body 7.

The magnetic body 7 is formed in a ring shape around the external periphery of the boss part 113 in its rotation direction and is fitted to the boss part 113. In the example illustrated in FIG. 2, the magnetic body 7 contains a ring plate shaped part which joins the external periphery of the pinion gear 3. The inside of the magnetic body 7 is fitted to the pinion gear 3 while the external periphery of the magnetic body 7 is defined by the magnetic body 7 and the engagement between the magnetic body 7 and the pinion gear 3.

The magnet 8 is located at radially outside of the magnetic body 7 and has a radial gap from the magnetic body 7. The magnet 8 is formed in a ring shape. Additionally, the magnetic plates 9a and 9b are located on both sides of the magnetic body 7 and have a gap from the magnetic body 7. The magnetic plates jointly form a ring around the radially external periphery of the magnetic body 7 and are radially outside the magnetic body 7. The magnetic plates 9a and 9b maintain the magnet 8 in the direction of the driving member. The external diameter of the magnetic plate 9a which is located on the cover member 6 (the housing part) side of the magnet 8 is larger than the external diameter of the magnetic plate 9b which is located on the opposite side of the lid part 6 of the magnet 8.

The magnet 8, the magnetic plate 9a and the magnetic plate 9b are fixed to each other by, for example, adhesive agent to form the magnetic seal device. The magnetic plate 9a is connected to the cover member 6 by a fixing component, for example, the screw 91. The magnetic seal device is fixed to the cover member 6. The screw 91 has the screw part which is screwed in the screw hole formed at the cover member 6 and the screw head which presses the magnetic plate 9a. At least two screws 91 are located on the circumference with the central shaft of the pinion gear 3 as the center with equal interval. The edge surface on the rotor 11 side of the cover member 6 is a plane surface.

There is a gap between the magnet 8, the internal periphery of the magnetic plates 9a and 9b and the magnetic body 7. The magnetic fluid 10 is located at the gap. The magnet 8, the magnetic plates 9a and 9b and the magnetic fluid 10 constitute the magnetic seal device.

The magnetic circuit is formed by the magnet 8, the magnetic plate 9a, the magnetic body 7 and the magnetic plate 9b. The magnetic fluid 10 is a substance which stably disperses the micro-particle of strong magnetic substance with a particle diameter ranging from a few nm to more than ten nm into, for example, hydrocarbon oil or fluorine grease based solution by using surfactant. Because the part opposite to the magnet 8 and the magnetic plates 9a and 9b of the magnetic body 7 is magnetized, the magnetic fluid 10 is kept in the realm surrounded by the magnet 8, the magnetic plates 9a and 9b and the magnetic body 7. The gap between the magnet 8, the magnetic plates 9a and 9b and the magnetic body 7 is sealed by the magnetic fluid 10 to prevent foreign substances from infiltrating from the housing room of the cylinder part 111 to the one-way clutch 5 side. Because the magnetic seal mechanism surrounds the periphery of the magnetic body 7 with liquid, it is airtight. Additionally, because there is no solid contact at the seal part, no dust is created. Because there is no movement at the sealing part, the loss of torque is small and the rotation performance is not declined.

Although the magnetic fluid 10 fills the whole realm surrounded by the magnet 8, the magnetic plates 9a and 9b and the magnetic body 7 in FIG. 2, the magnetic fluid can also be maintained between the magnetic plate 9a and the magnetic body 7 or between the magnetic plate 9b and the magnetic body 7 only. Additionally, if the internal periphery of the magnet 8 is enlarged a little, the magnetic fluid 10 can also be maintained at two parts, i.e., between the magnetic plate 9a and the magnetic body 7 and between the magnetic plate 9a and the magnetic body 7.

Because the magnetic force line of the magnet 8 is drawn near to the magnetic plates 9a, 9b and the magnetic body 7 and passes in the middle, the magnetism of the magnet 8 is not leaked on the one-way clutch 5 side. Therefore, the inner race 51 of the one-way clutch 5 is not magnetized and the magnet 8 does not influence the movement of the one-way clutch 5. As a result, in accordance with this embodiment, it is easy to assemble and the watertight performance can be maintained without deteriorating the performance of the one-way clutch 5.

Because the external diameter of the magnetic plate 9a is larger than the external diameter of the magnetic plate 9b and the magnetic plate 9a is installed at the edge surface of the cover member 6, it is unnecessary to form a segment part at the edge surface of the cover member 6 and the edge surface can be made a plane surface. As a result, it is easy to process the cover member 6. Additionally, because the magnet 8 and the magnetic plate 9b are fixed on the opposite side of the cover member 6 of the magnetic plate 9a, if the height of the screw head of the screw 91 which connects the magnetic plate 9a is limited within the range of the thickness of the magnet 8 and the magnetic plate 9b, the part protruding from the magnetic seal device to the wall part 112 side of the rotor 11 can be eliminated.

Although the shape of a pan head screw is described in FIG. 2, the screw 91 is not limited to the shape in FIG. 2. For example, a truss screw, oval head screw or a low head screw can also be used.

Figure 3:
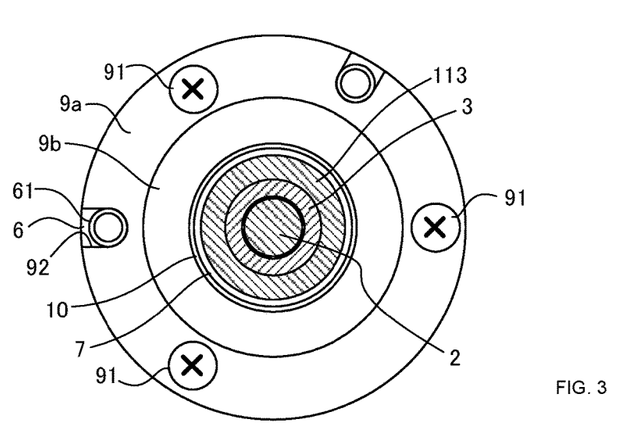
FIG. 3 is a sectional view taken along line A-A of FIG. 2.

FIG. 3 is a sectional view taken along line A-A of FIG. 2. In accordance with the example in FIG. 3, three screws 91 are located on the circumference with the central shaft of the pinion gear 3 as the center with equal intervals. A hole 92, which is fitted to a protrusion 61 of the cover member, is formed at two locations on the external periphery of the magnetic plate 9a. The gap between the magnetic seal device and the magnetic body 6 are positioned equally at the position where two protrusions 61 and two holes 92 are fitted, respectively. In accordance with the example in FIG. 3, the hole 92 is formed in U-shape which is cut from the external periphery of the magnetic plate 9a. The protrusion 61 and the hole 92 are formed at a position that does not interfere with the screw 91.

Figure 4:
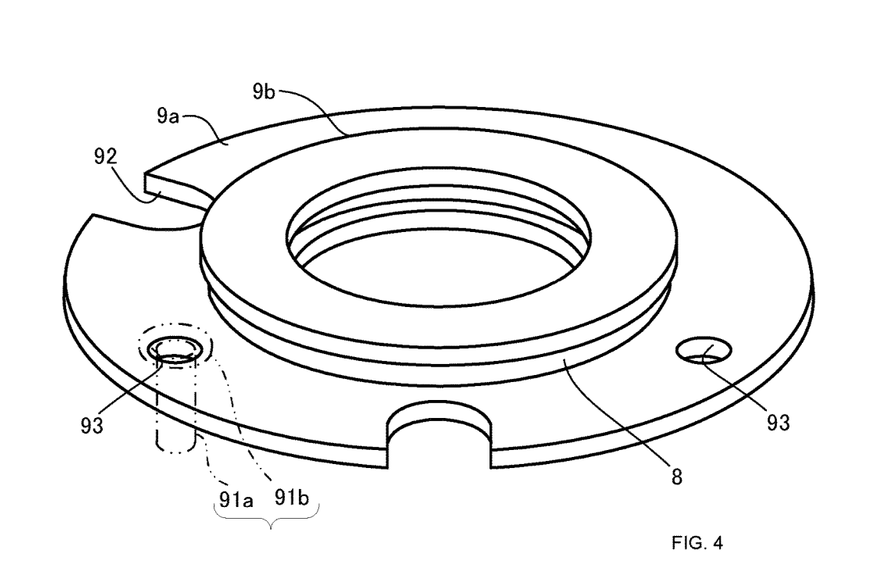
FIG. 4 is an oblique view of the magnetic seal device in accordance with the embodiment.

FIG. 4 is an oblique view of the magnetic seal device in accordance with the embodiment. The screw 91 is shown by a two-dot chain line. Although only one screw 91 is described in FIG. 4 (in order to avoid complication) there are actually three screws 91 as shown in FIG. 3. A hole 93 through which the screw 91 passes is formed in the magnetic plate 9a. Although one of the screws 93 is hidden at the magnetic plate and cannot be seen, three holes 93 are formed. As stated above, the screw 91 has the screw part 91a and the screw head 91b. The height from the surface on the magnet 8 side of the magnetic plate 9a (the first magnetic plate) to the surface opposite to the magnet 8 of the magnetic plate 9b (the second magnetic plate) is larger than the height of the screw head 91b.

Regarding the shape of the magnetic plate 9a and the magnetic plate 9b in FIG. 2, in other words, the external diameter of the internal side surface which joins the edge surface of the opening part periphery of the cover member 6 (the housing part) of the magnetic seal device which comprises the magnetic plate 9a (the first magnetic plate), the magnet 8 and the magnetic plate 9b (the second magnetic plate) is larger than the external diameter of the outside surface of the magnetic seal device. If it is constituted in this way, the relation between the magnetic plate 9a and the magnetic plate 9b is not limited to the example in FIG. 2.

Figure 5:
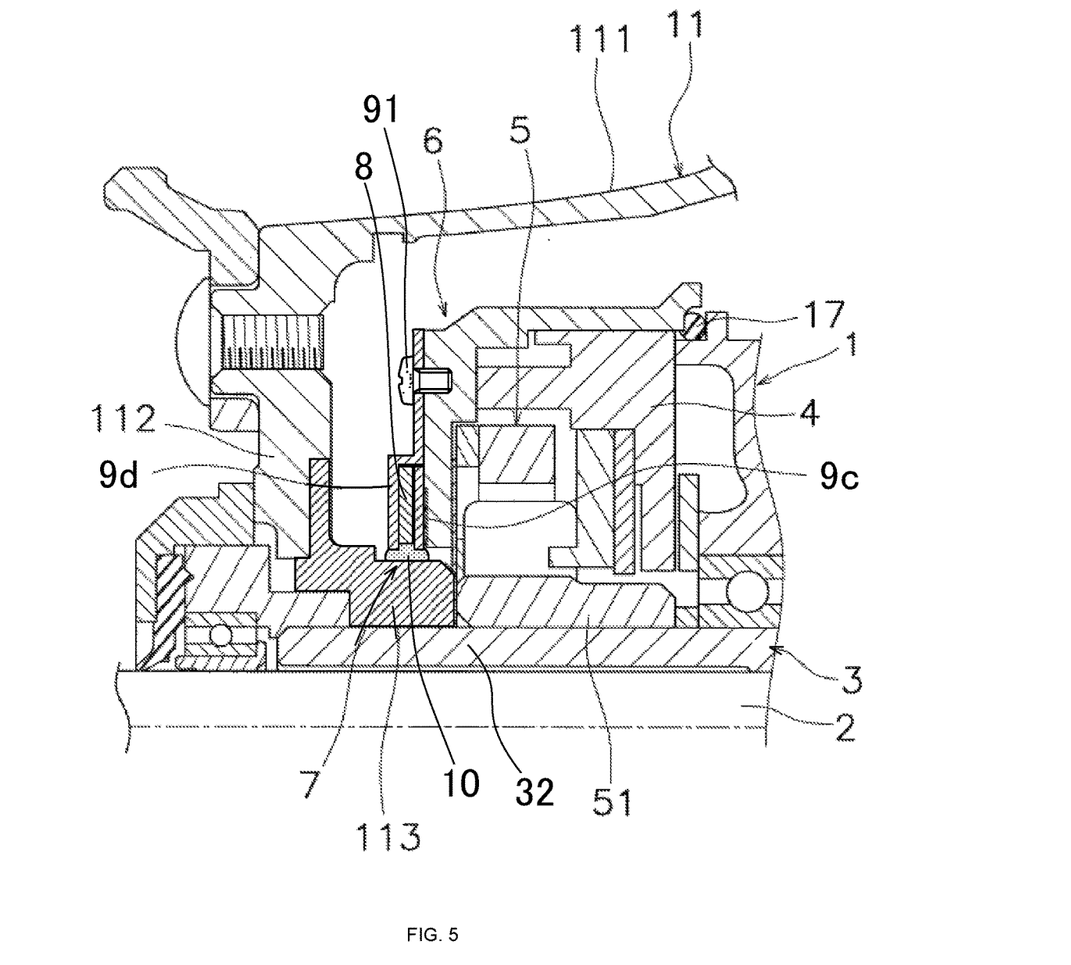
FIG. 5 is a sectional view of the magnetic seal device part in accordance with a variant embodiment.

FIG. 5 is a sectional view of a magnetic seal mechanism part in accordance with a variant example. In the variant example in FIG. 5, the magnet 8 is maintained by a magnetic plate 9c and a magnetic plate 9d. The magnetic plate 9d (the second magnetic plate) which is located on the opposite side of the cover member 6 of the magnet 8 is of a shape with a level difference formed by a concave part at the center. The magnet 8 and the magnetic plate 9c are embedded into the concave part of the magnetic plate 9d. The depth of the concave part of the magnetic plate 9d is almost the same as the thickness of the magnet 8 and the magnetic plate 9c. Once the magnet 8 and the magnetic plate 9c are embedded into the concave part of the magnetic plate 9d, the magnetic plate 9d and the magnetic 9c become almost co-planar.

Likewise in accordance with the variant example, the magnetic plate 9c and the magnetic 9d are fixed mutually by, for example, an adhesive agent to form the magnetic seal device. In the variant example, the magnetic plate 9d is connected to the cover member 6 by, for example, the screw 91 and the magnetic seal device is fixed to the cover member 6. At least two screws 91 are located on the circumference with the central shaft of the pinion gear 3 as the center with equal interval. The edge surface on the rotor 11 side of the cover member 6 is a plane surface.

Likewise, in accordance with the variant example, the external diameter of the inside surface which joins the edge surface of the opening part periphery of the cover member 6 (the housing part) of the magnetic seal device which comprises the magnetic plate 9c (the first magnetic plate), the magnet 8 and the magnetic plate 9d (the second magnetic plate) is larger than the external diameter of the outside surface of the magnetic seal device. Then, it is unnecessary to form the segment part on the edge surface of the cover member 6 and the edge surface can be made plane surface. As a result, the cover member 6 can be easily processed.

In the variant example, the hole 93 which passes the screw 91 is formed in the magnetic plate 9d. That is to say, the hole 93 which passes the fixing component is formed at the one of larger portions of the first magnetic plate and the second magnetic plate. The height from the surface on the magnet 8 side of the magnetic plate 9c (the first magnetic plate) to the surface on the opposite side of the magnet 8 of the magnetic plate 9d (the second magnetic plate) is larger than the height of the screw head 91b. Because the magnet 8 and the magnetic plate 9d are fixed on the opposite side of the cover member 6 of the magnetic plate 9c, if the height of the screw head of the screw 91 which connects the magnetic plate 9d is limited to the range of the thickness of the magnet 8 and the magnetic plate 9d, the part protruding from the magnetic seal device to the wall part 112 side of the rotor 11 can be deleted.

In the variant example, although it is necessary to form the concave part at the magnetic plate 9d, the interface between the magnetic plate 9d and the magnet 8 and the surface between the magnet 8 and the magnetic plate 9c are covered and protected by the magnetic plate 9d. Additionally, the concave part of the magnetic plate 9d can be formed through, for example, drawing press processing.

Likewise in the variant example, as shown in FIG. 3, the hole 92 where the protrusion 61 of the cover member 6 is fitted can be formed on the inside surface of the magnetic seal device which joins the edge surface of the opening part periphery of the cover member. If the protrusion approaches the external periphery, the hole 92 is formed at the magnetic plate 9d.

In the variant example, the boss part of the rotor 11 and the magnet 7 are different in constitution. The boss part 113 is formed by magnetic material while the magnetic body 7 is formed integrally with the boss part 113. The rotor 11 is formed by the cylinder part 111 and the wall part 112 integrally while the boss part 113 is formed by another component. The internal periphery part of the wall part 112 is fixed to the boss part 113 and forms the rotor 11. The wall part 112 is fixed to the boss part 113 by, for example, strong pressing, caulking, adhesion or screw clamp. Other constitutions are same as in FIG. 2.

Likewise in the variant example, because the magnetic force line of the magnet 8 is drawn near to the magnetic plates 9c, 9d and the boss part 113 and passes in the middle, the magnetism of the magnet 8 is not leaked on the one-way clutch 5 side. Therefore, the inner race 51 of the one-way clutch 5 is not magnetized and the magnet 8 does not influence the movement of the one-way clutch 5. As a result, like in the above example, it is easy to assemble and the stable watertight performance can be maintained without deteriorating the performance of the one-way clutch 5.

In the variant example, because the external periphery surface of the magnetic body 7 (the boss part 113) opposite to the magnet 8 and the magnetic plates 9c and 9d is stipulated by the engagement precision of the boss part 113 and the pinion gear 3, the precision of the gap between the magnetic plate 9c and 9d is improved. As a result, the sealing performance of the magnetic seal device is improved.

In the embodiment, although the constitution where the one-way clutch 5 which is fitted to the pinion gear 3 which drives the rotor 11 of the spinning reel 100 is sealed by the magnetic seal device has been described, the magnetic seal device of the fishing reel is not limited to the example. It also applies that the magnetic seal device which seals the opening part of the housing part which protrudes the driving member from the opening and partly houses the driving member is installed from the protruding side of the driving member to the housing part.

Additionally, the magnetic circuit formed opposite to the magnet and the magnetic plate is not limited to the magnetic body 7 in FIG. 2 and the boss part 113 in FIG. 5. For example, in case that the pinion gear 3 is formed by a magnetic body, the magnetic fluid can be located between the pinion gear 3 and the magnetic plate.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A fishing reel comprising:
a reel body,
a driving member rotatably supported on the reel body,
a housing part that at least partially accommodates the driving member extending through an opening thereof, and
a magnetic seal device sealing a gap between the driving member and the opening of the housing part,
wherein the magnetic seal device includes
a magnet,
first and second magnetic plates which maintain the magnet, the first magnetic plate is located adjacent the housing part and the second magnetic plate is located on an opposite side of the housing part of the magnet, wherein the first magnetic plate includes a second hole defined therein that is adapted to receive a protrusion, wherein the second hole is open to an exterior diameter of the first magnetic plate, and
a magnetic fluid maintained at a gap between the driving member and at least one of the first magnetic plate and the second magnetic plate,
wherein an external diameter of the housing part is larger than an external diameter of the magnetic seal device.

2. The fishing reel in accordance with claim 1 wherein an external diameter of the first magnetic plate is larger than an external diameter of the second magnetic plate.

3. The fishing reel in accordance with claim 1 further comprising a fixing component that fixes the magnetic seal device to the housing part.

4. The fishing reel in accordance with claim 3 wherein a hole is formed in one of the first magnetic plate or the second magnetic plate, and wherein the fixing component is received in the hole.

5. The fishing reel in accordance with claim 4 wherein the fixing component is a screw that includes a screw part and a screw head, wherein the first and second magnetic plates each include a front surface, and wherein a distance from the front surface of the first magnetic plate to the front surface of the second magnetic plate is larger than a height of the screw head.

6. A fishing reel comprising:
a reel body;
a housing part including an opening part, wherein the housing part includes a cover member;
a driving member including a pinion that is rotatably supported by the reel body and extends through the opening part of the housing part; and
a magnetic seal device affixed to the housing part and that seals a gap between the housing and the driving member;
wherein the magnetic seal device includes
a magnet,
first and second magnetic plates securing the magnet therebetween, wherein the first magnetic plate is attached to a front surface of the cover member, wherein the first magnetic plate includes a second hole defined therein, wherein the cover member includes at least one protrusion extending from a front surface thereof that is received in the second hole, and wherein the second hole is open to an exterior diameter of the first magnetic plate; and a magnetic fluid that is maintained at a gap between the driving member and at least one of the first and second magnetic plates.

7. The fishing reel of claim 6 wherein the cover member has an outer diameter that is larger than an outer diameter of the magnetic seal device.

8. The fishing reel of claim 6 wherein one of the first and second magnetic plates has an outer diameter that is larger than the other of the first and second magnetic plates.

9. The fishing reel of claim 8 wherein the first magnetic plate has an outer diameter that is larger than the second magnetic plate, wherein a first hole is formed in the first magnetic plate, and wherein a fixing component extends through the first hole to attach the first magnetic plate to the cover member.

10. The fishing reel of claim 9 wherein the fixing component is a screw that includes a screw part and a screw head, wherein the first and second magnetic plates each include a front surface, and wherein a distance from the front surface of the first magnetic plate to the front surface of the second magnetic plate is larger than a height of the screw head.

11. The fishing reel of claim 6 further comprising a rotor that includes a cylinder part,
a wall part and a boss part, wherein the boss part is at least partially received in a central opening of the magnetic seal device.

12. The fishing reel of claim 11 wherein a magnetic body at least partially surrounds the boss part, and wherein the magnetic fluid is maintained between the magnetic body and at least one of the first and second magnetic plates.

13. A magnetic seal device for a fishing reel comprising:
a ring shaped magnet, and
a first magnetic plate and a second magnetic plate that maintain the magnet therebetween, wherein the first magnetic plate has an outer diameter that is larger than the second magnetic plate, wherein at least a first hole is formed in the first magnetic plate,
wherein a fixing component extends through the first hole and is adapted to attach the first magnetic plate to a cover member, wherein the first magnetic plate includes a second hole defined therein that is adapted to receive a protrusion, wherein the second hole is open to an exterior diameter of the first magnetic plate.

14. The magnetic seal device of claim 13 wherein the fixing component is a screw that includes a screw part and a screw head, wherein the first and second magnetic plates each include a front surface, and wherein a distance from the front surface of the first magnetic plate to the front surface of the second magnetic plate is larger than a height of the screw head.

* * * * *